(12) United States Patent
Feng et al.

(10) Patent No.: US 11,252,630 B2
(45) Date of Patent: Feb. 15, 2022

(54) RAIL TRANSIT COMMUNICATION METHOD AND SYSTEM

(71) Applicants: CRRC ZHUZHOU ELECTRIC LOCOMOTIVE RESEARCH INSTITUTE CO., LTD., Hunan (CN); NEW JERSEY INSTITUTE OF TECHNOLOGY, Newark, NJ (US)

(72) Inventors: Jianghua Feng, Hunan (CN); Mina Taheri, Newark, NJ (US); Qiang Fan, Newark, NJ (US); Nirwan Ansari, Newark, NJ (US); Roberto Rojas-Cessa, Newark, NJ (US); Mengchu Zhou, Newark, NJ (US); Gaohua Chen, Hunan (CN); Dajun Wang, Hunan (CN); Jun Tang, Hunan (CN); Tairan Zhang, Hunan (CN)

(73) Assignees: CRRC ZHUZHOU ELECTRIC LOCOMOTIVE RESEARCH INSTITUTE CO., LTD., Hunan (CN); NEW JERSEY INSTITUTE OF TECHNOLOGY, Newark, NJ (US)

( * ) Notice: Subject to any disclaimer, the term of this patent is extended or adjusted under 35 U.S.C. 154(b) by 299 days.

(21) Appl. No.: 16/488,233

(22) PCT Filed: May 17, 2017

(86) PCT No.: PCT/CN2017/084654
§ 371 (c)(1),
(2) Date: Aug. 22, 2019

(87) PCT Pub. No.: WO2018/192040
PCT Pub. Date: Oct. 25, 2018

(65) Prior Publication Data
US 2019/0380084 A1    Dec. 12, 2019

(30) Foreign Application Priority Data

Apr. 21, 2017    (CN) .......................... 201710265444.1

(51) Int. Cl.
*H04W 36/32* (2009.01)
*H04L 29/08* (2006.01)

(52) U.S. Cl.
CPC ............ *H04W 36/32* (2013.01); *H04L 67/12* (2013.01)

(58) Field of Classification Search
CPC .............. H04W 36/32; H04W 84/005; H04W 36/00835; H04L 67/12
See application file for complete search history.

(56) References Cited

U.S. PATENT DOCUMENTS

| 10,171,159 B1* | 1/2019 | Tailor | H04W 52/16 |
| 2002/0082036 A1* | 6/2002 | Ida | H04W 52/283 |
| | | | 455/522 |

(Continued)

OTHER PUBLICATIONS

IEEE Wireless Communications—Radiate: Radio Over Fiber as an Antenna Extender for High-Speed Train Communications, Authors Tao Han and Nirwan Ansari—Published in: IEEE Wireless Communications (vol. 22, Issue: 1, Feb. 2015); Date of Publication: Mar. 9, 2015 (Year: 2015).*

(Continued)

*Primary Examiner* — Edan Orgad
*Assistant Examiner* — Malick A Sohrab
(74) *Attorney, Agent, or Firm* — Yue (Robert) Xu; Apex Attorneys at Law, LLP

(57) ABSTRACT

A method and a system for rail transit communication. The method includes: selecting a second target FSO transceiver from the FSO transceivers that are currently located within a signal coverage of a target FSO base station, in response to detecting that a first target free-space-optics (FSO) trans- (Continued)

ceiver moves out of the signal coverage of the target FSO base station when data communication between the target FSO base station and the target user terminal is performed via the first target FSO transceiver, where the target FSO base station is one of the FSO base stations located on the rail; and maintaining the data communication between the target FSO base station and the target user terminal, by using the second target FSO transceiver. Handover among the base stations is reduced for user equipment, data communication rate is increased, and communication experience of passengers can be improved.

6 Claims, 5 Drawing Sheets

(56) References Cited

U.S. PATENT DOCUMENTS

| | | | |
|---|---|---|---|
| 2008/0042912 A1 | 2/2008 | Lee | |
| 2011/0107377 A1 | 5/2011 | Petrisor | |
| 2011/0317553 A1* | 12/2011 | Dinan | H04L 5/0073 370/230 |
| 2014/0136658 A1 | 5/2014 | Wahler | |
| 2014/0149547 A1* | 5/2014 | Barker | H04W 48/20 709/217 |
| 2014/0198657 A1* | 7/2014 | Ji | H04L 47/125 370/235 |
| 2014/0349704 A1* | 11/2014 | Xiao | H04W 16/08 455/525 |
| 2015/0078333 A1* | 3/2015 | Byers | H04W 36/32 370/331 |
| 2019/0036595 A1* | 1/2019 | Ohtsuji | H04B 7/15 |
| 2019/0379450 A1* | 12/2019 | Kamei | H04B 7/15542 |

OTHER PUBLICATIONS

Mina Taheri, Provisioning Internet Access Using FSO in High-Speed Rail Networks, «IEEE Network», Jan. 20, 2017.
1st Office Action regarding Chinese Patent Application No. CN201710265444.1, dated Aug. 28. 2019. English Translation Provided by http://globaldossier.uspto.gov.
International Search Report for PCT/CN2017/084654 dated Sep. 29, 2017, ISA/CN.
Tao Han et al. Radiate: Radio over Fiber as an Antenna Extender for High-Speed Train Communications. IEEE Wireless Communications Feb. 28, 2015 (Feb. 28, 2015).22(1), ISSN: 1536-1284, pp. 130-135.
Shinichiro Haruyama et al. New Ground-to-train High-speed Free-space Optical Communication System with Fast Handover Mechanism, Optical Fiber Communication Conference and Exposition (OFC/NFOEC)2011 and The National Fiber Optic Engineers Conference. Mar. 10, 2011 (Mar. 10, 2011), section 2.
Russian-1st-Office-Action dated Jun. 10, 2020 for Application No. 2019128440.
Mahmudur Khan, Maintaining a Free-Space-Optical Communication Link Between Two Autonomous Mobiles, 2014 IEEE Wireless Communications and Networking Conference (WCNC), Apr. 9, 2014, pp. 3154-3159.
2nd Office Action regarding Chinese Patent Application No. CN201710265444.1, dated Jan. 9, 2020. English Translation Provided by http://globaldossier.uspto.gov.

* cited by examiner

Select a second target FSO transceiver from the FSO transceivers that are currently located within the signal coverage of the target FSO base station, in response to detecting that a first target FSO transceiver moves out of a signal coverage of a target FSO base station when data communication between the target FSO base station and the target user terminal is performed via the first target FSO transceiver, where the target FSO base station is one of the FSO base stations located on the rail. — S11

Maintain the data communication between the target FSO base station and the target user terminal, by using the second target FSO transceiver. — S12

Figure 1

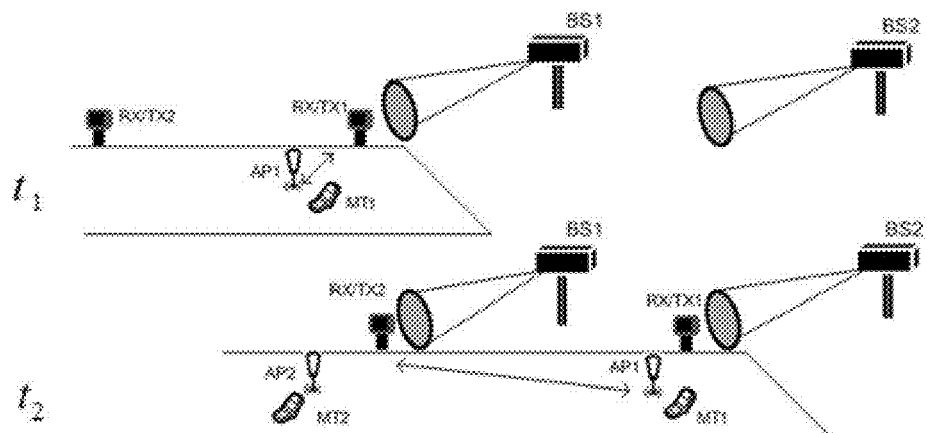

Figure 2

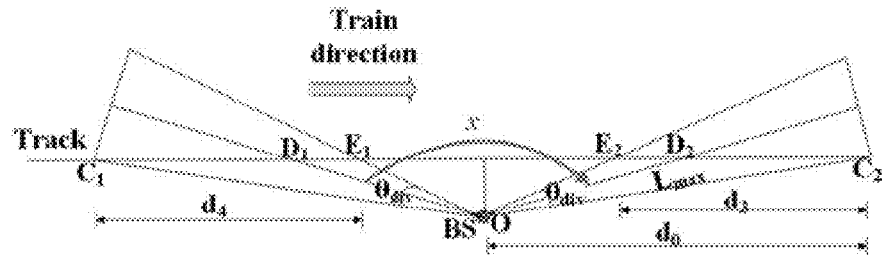

Figure 3

```
Acquire a traffic load of each FSO transceiver that is currently
located within the signal coverage of the target FSO base station, and
determine the FSO transceiver with the minimum traffic load as the      S21
second target FSO transceiver, in response to detecting that a first
target FSO transceiver moves out of a signal coverage of a target
FSO base station when data communication between the target FSO
base station and the target user terminal is performed via the first
target FSO transceiver.
```

```
Maintain the data communication between the target FSO base          S22
station and the target user terminal, by using the second target FSO
transceiver.
```

Figure 4

Acquire a traffic load of each FSO transceiver that is currently located within the signal coverage of the target FSO base station, and determine a first weight coefficient for each FSO transceiver that is currently located within the signal coverage of the target FSO base station based on magnitude of the traffic load, in response to detecting that a first target FSO transceiver moves out of a signal coverage of a target FSO base station when data communication between the target FSO base station and the target user terminal is performed via the first target FSO transceiver. — S41

Acquire a communication distance between the target user terminal and each FSO transceiver that is currently located within the signal coverage of the target FSO base station, and determine a second weight coefficient for each FSO transceiver that is currently located within the signal coverage of the target FSO base station based on magnitude of the communication distance. — S42

Calculate a priority index for each FSO transceiver that is currently located within the signal coverage of the target FSO base station, based on the first weight coefficient and the second weight coefficient, and determine the FSO transceiver with the maximum priority index as the second target FSO transceiver. — S43

Maintain the data communication between the target FSO base station and the target user terminal, by using the second target FSO transceiver. — S44

Figure 6

RAIL TRANSIT COMMUNICATION METHOD AND SYSTEM

This application is the national phase of International Application No. PCT/CN2017/084654, titled "RAIL TRANSIT COMMUNICATION METHOD AND SYSTEM", filed on May 17, 2017, which claims priority to Chinese Patent Application No. 201710265444.1, titled "METHOD AND SYSTEM FOR RAIL TRANSIT COMMUNICATION", filed on Apr. 21, 2017 with the China National Intellectual Property Administration, which is incorporated herein by reference in its entirety.

FIELD

The present disclosure relates to the technical field of communication, and in particular, to a method and a system for rail transit communication.

BACKGROUND

Currently, several solutions for railway wireless communication are proposed to facilitate users using broadband internet services on trains, such as technical solutions based on leakage coaxial cables, satellite links, and WiMax (Worldwide Interoperability for Microwave Access).

There are following common problems in conventional technical solutions for railway wireless communication. First, communication rate is low and is difficult to meet requirements of users. Second, in conventional technical solutions, user equipment is frequently handed over among base stations with which it communicates during a travelling train. Such frequent handover among the base stations severely reduces data transmission rate. In a case that the handover fails, passengers may not be able to use the broadband internet services at such time. In summary, communication quality of conventional railway wireless communication needs to be further improved to enhance communication experience of the passengers.

SUMMARY

In view of the above, an objective of the present disclosure is to provide a method and a system for rail transit communication, which effectively reduces frequency of handover between user equipment and base stations and improves rate of data transmission, thereby improving communication experience of the passengers. Specific solutions are as follows.

A method for rail transit communication is provided, which is applied to a system for rail transit communication, where the system includes FSO transceivers and a central controller that are located on a train, and FSO base stations located on a rail, and the method includes:
selecting a second target FSO transceiver from the FSO transceivers that are currently located within a signal coverage of a target FSO base station, in response to detecting that a first target FSO transceiver moves out of the signal coverage of the target FSO base station when data communication between the target FSO base station and the target user terminal is performed via the first target FSO transceiver, where the target FSO base station is one of the FSO base stations located on the rail; and
maintaining the data communication between the target FSO base station and the target user terminal, by using the second target FSO transceiver.

Optionally, selecting the second target FSO transceiver from the FSO transceivers that are currently located within the signal coverage of the target FSO base station includes: acquiring a traffic load of each of the FSO transceivers that are currently located within the signal coverage of the target FSO base station; and determining one with a minimum of the traffic load, among the FSO transceivers that are currently located within the signal coverage of the target FSO base station, as the second target FSO transceiver.

Optionally, selecting the second target FSO transceiver from the FSO transceivers that are currently located within the signal coverage of the target FSO base station includes: acquiring a communication distance between the target user terminal and each of the FSO transceivers that are currently located within the signal coverage of the target FSO base station; and determining one with a minimum of the communication distance, among the FSO transceivers that are currently located within the signal coverage of the target FSO base station, as the second target FSO transceiver.

Optionally, selecting the second target FSO transceiver from the FSO transceivers that are currently located within the signal coverage of the target FSO base station includes: acquiring a traffic load of each of the FSO transceivers that are currently located within the signal coverage of the target FSO base station; and determining a first weight coefficient for each of the FSO transceivers that are currently located within the signal coverage of the target FSO base station, based on magnitude of the traffic load; acquiring a communication distance between the target user terminal and each of the FSO transceivers that are currently located within the signal coverage of the target FSO base station; and determining a second weight coefficient for each of the FSO transceivers that are currently located within the signal coverage of the target FSO base station, based on magnitude of the communication distance; and calculating a priority index, for each of the FSO transceivers that are currently located within the signal coverage of the target FSO base station, based on the first weight coefficient and the second weight coefficient; and determining one with a maximum of the priority index, among the FSO transceivers that are currently located within the signal coverage of the target FSO base station, as the second target FSO transceiver.

Optionally, the method further includes:
adjusting an azimuth of each of the FSO transceivers based on an actual communication state of said FSO transceiver, in communication between said FSO transceiver and outside, to optimize communication quality of a corresponding communication network.

Optionally, the method further includes:
adjusting an azimuth of each of the FSO base stations based on an actual communication state of said FSO base station, in communication between said FSO base station and outside, to optimize communication quality of a corresponding communication network.

A system for rail transit communication is further provided according to the present disclosure, including FSO transceivers and a central controller that are located on a train, and FSO base stations located on a rail, where the central controller calls instructions in a memory to perform:
selecting a second target FSO transceiver from the FSO transceivers that are currently located within a signal coverage of a target FSO base station, in response to detecting that a first target FSO transceiver moves out of the signal coverage of the target FSO base station when data communication between the target FSO base station and the target user terminal is performed via the first target FSO transceiver; and maintaining the data communication between the target FSO base station and the target user terminal, by using the second target FSO transceiver; where the target FSO base station is one of the FSO base stations located on the rail.

Optionally, the central controller in selecting the second target FSO transceiver from the FSO transceivers that are currently located within the signal coverage of the target FSO base station performs:

acquiring a traffic load of each of the FSO transceivers that are currently located within the signal coverage of the target FSO base station; and determining one with a minimum of the traffic load, among the FSO transceivers that are currently located within the signal coverage of the target FSO base station, as the second target FSO transceiver; or acquiring a communication distance between the target user terminal and each of the FSO transceivers that are currently located within the signal coverage of the target FSO base station; and determining one with a minimum of the communication distance, among the FSO transceivers that are currently located within the signal coverage of the target FSO base station, as the second target FSO transceiver; or acquiring a traffic load of each of the FSO transceivers that are currently located within the signal coverage of the target FSO base station; determining a first weight coefficient for each of the FSO transceivers that are currently located within the signal coverage of the target FSO base station, based on magnitude of the traffic load; acquiring a communication distance between the target user terminal and each of the FSO transceivers that are currently located within the signal coverage of the target FSO base station; determining a second weight coefficient for each of the FSO transceivers that are currently located within the signal coverage of the target FSO base station, based on magnitude of the communication distance; calculating a priority index, for each of the FSO transceivers that are currently located within the signal coverage of the target FSO base station, based on the first weight coefficient and the second weight coefficient; and determining one with a maximum of the priority index, among the FSO transceivers that are currently located within the signal coverage of the target FSO base station, as the second target FSO transceiver.

Optionally, the system further includes a rotator arranged on each of the FSO transceivers, where:

the rotator is configured to adjust an azimuth of said FSO transceiver based on an actual communication state of said FSO transceiver, in communication between said FSO transceiver and outside, to optimize communication quality of a corresponding communication network.

Optionally, the system further includes a rotator arranged on each of the FSO transceivers, where:

the rotator is configured to adjust an azimuth of said FSO base station based on an actual communication state of said FSO base station, in communication between said FSO base station and outside, to optimize communication quality of a corresponding communication network.

According to the present disclosure, the method for rail transit communication is applied to the system for rail transit communication. The system includes the FSO transceivers and the central controller that are located on the train, and the FSO base stations located on the rail. The method includes: selecting the second target FSO transceiver from the FSO transceivers that are currently located within the signal coverage of the target FSO base station, in response to detecting that the first target FSO transceiver moves out of the signal coverage of the target FSO base station when data communication between the target FSO base station and the target user terminal is performed via the first target FSO transceiver, where the target FSO base station is one of the FSO base stations located on the rail; and maintaining the data communication between the target FSO base station and the target user terminal, by using the second target FSO transceiver.

According to the present disclosure, in a case that the first target FSO transceiver moves out of the signal coverage of the target FSO base station during the data communication between the target FSO base station and the target user terminal via the first target FSO transceiver, it means that the target user terminal is unable to communicate with the target FSO base station via the first target FSO transceiver at such time. According to the present disclosure, one FSO transceiver is selected from all the FSO transceivers that are currently located within the signal coverage of the target FSO base station, and the selected FSO transceiver is used to replace the previous first target FSO transceiver, so that the target user terminal can continue using the broadband internet services. Namely, the selected FSO transceiver described above is used to maintain the data communication between the target FSO base station and the target user terminal. Thereby, in a case that the first target FSO transceiver has moved out of the signal coverage of the target FSO base station, the target user terminal can continue using the broadband internet services without being handed over among the FSO base stations with which it communicates. Hence, frequency of handover among the base stations is reduced for the user terminal. Additionally, the rail transit communication is implemented based on FSO communication technology according to the present disclosure. Compared with other communication technologies, the FSO communication technology has a higher data communication rate, and can better improve the communication experience of passengers.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

FIG. 1 is a flowchart of a method for rail transit communication according to an embodiment of the present disclosure;

FIG. 2 is a schematic diagram of a handover process for an FSO transceiver in operation of a train according to an embodiment of the present disclosure;

FIG. 3 is a schematic diagram of a signal coverage of a rotatable FSO transceiver according to an embodiment of the present disclosure;

FIG. 4 is a flowchart of a method for rail transit communication according to an embodiment of the present disclosure;

FIG. 6 is a flowchart of a method for rail transit communication according to an embodiment of the present disclosure.

DETAILED DESCRIPTION

Figure 5:
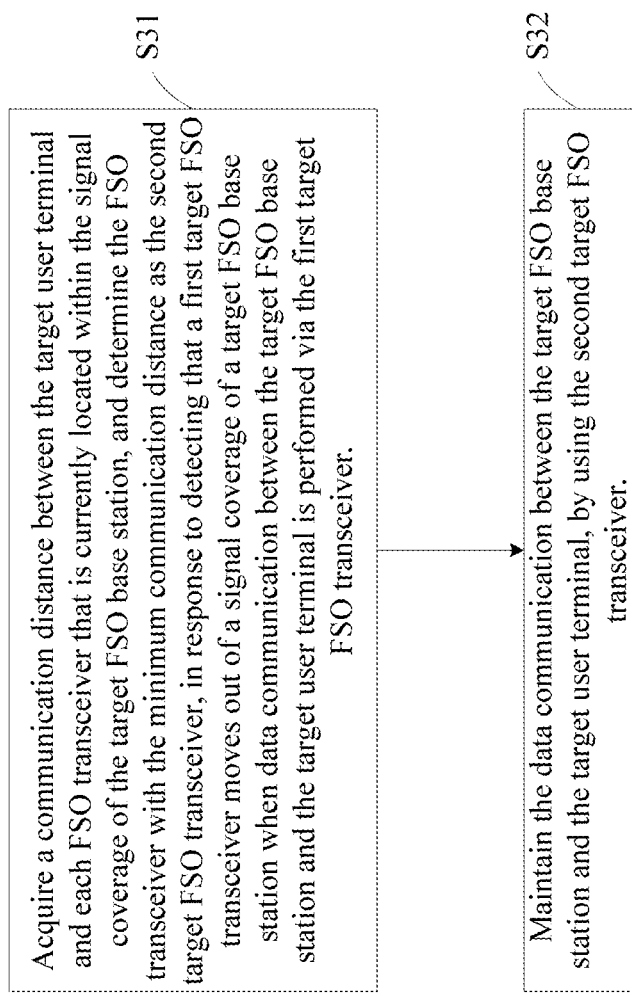
FIG. 5 is a flowchart of a method for rail transit communication according to an embodiment of the present disclosure.

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

A method for rail transit communication is disclosed according to an embodiment of the present disclosure. The method is applied to a system for rail transit communication. The system includes FSO transceivers and a central controller that are located on a train, and FSO base stations located on a rail. Referring to FIG. 1, the above method includes steps S11 and S12.

In step S11, a second target FSO transceiver is selected from the FSO transceivers that are currently located within a signal coverage of a target FSO base station, in response to detecting that a first target FSO transceiver moves out of the signal coverage of the target FSO base station when data communication between the target FSO base station and the target user terminal is performed via the first target FSO transceiver.

The target FSO base station is one of the FSO base stations located on the rail.

In addition, it should be noted that a corresponding access point AP (Access Point) is required to be configured between the user terminal and each FSO transceiver in this embodiment. The access point AP is also arranged on the train, and generally arranged inside the train. Specifically, the FSO transceiver may be arranged outside the train or inside the train.

In step S12, the data communication between the target FSO base station and the target user terminal is maintained by using the second target FSO transceiver.

For example, referring to FIG. 2, it is assumed that the user terminal MT1 communicates with the FSO base station BS1 via the access point AP1 and the FSO transceiver TX/RX1 at a moment t1. Since the train is travelling fast, the TX/RX1 is no longer within the signal coverage of BS1 and enters signal coverage of a FSO base station BS2 at a moment t2. At such time, the communication between the user terminals MT1 and BS1 is maintained by the FSO transceiver TX/RX2 which has already been within the signal coverage of BS1. Accordingly, in fast movement of the train, the user terminal MTI can always keep communicating with the BSI without being handed over among the base stations, as long as on the train there is an FSO transceiver located within the signal coverage range of BS1. Thereby, the frequency of handover among the base stations is greatly reduced for the user terminal.

In order to further improve communication quality for the user terminal, the method for rail transit communication in one embodiment of the present disclosure may further include a following step. An azimuth of each of the FSO transceivers is adjusted based on an actual communication state of said FSO transceiver in communication between said FSO transceiver and outside, so as to optimize communication quality of a corresponding communication network. Referring to FIG. 3, the azimuth of the FSO transceiver is adjusted according to the present disclosure, ensuring large communication coverage of the FSO transceiver. It is facilitated through free rotation that continuous alignment between the base station and the on-vehicle FSO transceiver is ensured to be maintained for long time. Compared with a stationary transceiver, the transceiver of which the azimuth is free to adjust has a larger range for communication, facilitating improving communication stability and communication rate, and increasing spacing between the base stations along the rail. Thereby, a quantity of the base stations is reduced, effectively reducing a cost in investment.

In order to further improve communication quality for the user terminal, the method for rail transit communication in one embodiment of the present disclosure may further include a following step. An azimuth of each of the FSO base stations is adjusted based on an actual communication state of said FSO base station in communication between said FSO base station and outside, so as to optimize communication quality of a corresponding communication network. In this embodiment, the FSO base station may be a base station of which the azimuth is free to adjust. Compared with a stationary base station, the base station of which the azimuth is free to adjust has a larger range for communication.

According to this embodiment of the present disclosure, in a case that the first target FSO transceiver moves out of the signal coverage of the target FSO base station during the data communication between the target FSO base station and the target user terminal via the first target FSO transceiver, it means that the target user terminal is unable to communicate with the target FSO base station via the first target FSO transceiver at such time. According to this embodiment of the present disclosure, one FSO transceiver is selected from all the FSO transceivers that are currently located within the signal coverage of the target FSO base station, and the selected FSO transceiver is used to replace the previous first target FSO transceiver, so that the target user terminal can continue using the broadband internet services. Namely, the selected FSO transceiver described above is used to maintain the data communication between the target FSO base station and the target user terminal. Thereby, in a case that the first target FSO transceiver has moved out of the signal coverage of the target FSO base station, the target user terminal can continue using the broadband internet services without being handed over among the FSO base stations with which it communicates. Hence, frequency of handover among the base stations is reduced for the user terminal. Additionally, the rail transit communication is implemented based on FSO communication technology according to this embodiment of the present disclosure. Compared with other communication technologies, the FSO communication technology has a higher data communication rate, and can better improve the communication experience of passengers.

Referring to FIG. 4, a specific method for rail transit communication is disclosed according to an embodiment of the present disclosure, including steps S21 and S22.

In step S21, a traffic load is acquired for each FSO transceiver that is currently located within the signal coverage of the target FSO base station, and the FSO transceiver with the minimum traffic load is determined as the second target FSO transceiver, in response to detecting that a first target FSO transceiver moves out of the signal coverage of the target FSO base station when data communication between the target FSO base station and the target user terminal is performed via the first target FSO transceiver.

In step S22, the data communication between the target FSO base station and the target user terminal is maintained by using the second target FSO transceiver.

Namely, in this embodiment of the present disclosure, the one with the minimum traffic load among the FSO transceiver that are currently located within the signal coverage of the target FSO base station may be determined as the second target FSO transceiver, so as to balance the traffic load between the transceivers, in a case that the first target FSO transceiver has moved outside the signal coverage of the target FSO base station. Thereby, it is achieved that traffic is directed to the transceiver with a light load, facilitating alleviation of signaling congestion and communication requests being in a queued or delayed state for a long time.

Referring to FIG. 5, a specific method for rail transit communication is disclosed according to an embodiment of the present disclosure, including steps S31 and S32.

In step S31, a communication distance between the target user terminal and each FSO transceiver that is currently located within the signal coverage of the target FSO base station is acquired, and the FSO transceiver with the minimum communication distance is determined as the second target FSO transceiver, in response to detecting that a first target FSO transceiver moves out of the signal coverage of the target FSO base station when data communication between the target FSO base station and the target user terminal is performed via the first target FSO transceiver.

In step S32, the data communication between the target FSO base station and the target user terminal is maintained by using the second target FSO transceiver.

Namely, in this embodiment of the present disclosure, the communication distance may be used as a basis for selecting the FSO transceiver, so that the selected FSO transceiver has a shortest communication distance to the target user terminal. It is facilitated that the communication quality of the target user terminal is ensured.

Referring to FIG. 6, a specific method for rail transit communication is disclosed according to an embodiment of the present disclosure, including steps S41 to S44.

In step S41, a traffic load is acquired for each FSO transceiver that is currently located within the signal coverage of the target FSO base station, and a first weight coefficient is determined for each FSO transceiver that is currently located within the signal coverage of the target FSO base station based on magnitude of the traffic load, in response to detecting that a first target FSO transceiver moves out of the signal coverage of the target FSO base station when data communication between the target FSO base station and the target user terminal is performed via the first target FSO transceiver.

It can be understood that, in this embodiment, there is a negative correlation between magnitude of the traffic load of the FSO transceiver and magnitude of the first weight coefficient.

In step S42, a communication distance between the target user terminal and each FSO transceiver that is currently located within the signal coverage of the target FSO base station is acquired, and a second weight coefficient is determined for each FSO transceiver that is currently located within the signal coverage of the target FSO base station based on magnitude of the communication distance.

It can be understood that, in this embodiment, there is a negative correlation between magnitude of the communication distance and magnitude of the second weight coefficient.

In step S43, a priority index is calculated for each FSO transceiver based on the first weight coefficient and the second weight coefficient, and the FSO transceiver with the maximum priority index is determined as the second target FSO transceiver.

In this embodiment, the priority index corresponding to each FSO transceiver may be obtained by adding the first weight coefficient and the second weight coefficient for each FSO transceiver. The larger the priority index of an FSO transceiver is, the more potential the FSO transceiver has to be the second target FSO transceiver. In this embodiment of the present disclosure, the FSO transceiver with the maximum priority index is preferably determined as the second target FSO transceiver.

In step S44, the data communication between the target FSO base station and the target user terminal is maintained by using the second target FSO transceiver.

Figure 7:
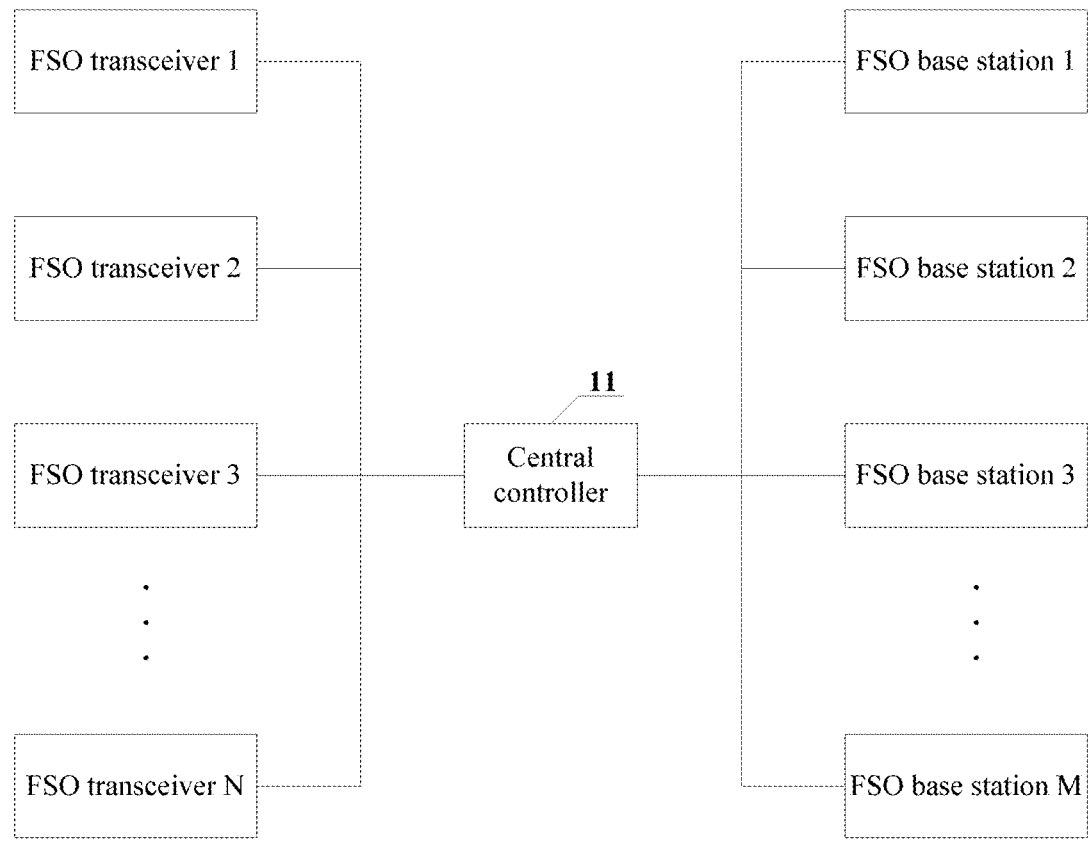
FIG. 7 is a schematic structural diagram of a system for rail transit communication according to an embodiment of the present disclosure.

Correspondingly, a system for rail transit communication is disclosed according to an embodiment of the present disclosure, as shown in FIG. 7. The system includes FSO transceivers and a central controller 11 that are located on a train, and FSO base stations located on a rail. The central controller 11 calls instructions in a memory to perform following steps.

A second target FSO transceiver is selected from the FSO transceivers that are currently located within a signal coverage of a target FSO base station, in response to detecting that a first target FSO transceiver moves out of the signal coverage of the target FSO base station when data communication between the target FSO base station and the target user terminal is performed via the first target FSO transceiver. The data communication between the target FSO base station and the target user terminal is maintained by using the second target FSO transceiver. The target FSO base station is one of the FSO base stations located on the rail.

It should be noted that a corresponding access point AP is required to be configured between the user terminal and each FSO transceiver in this embodiment. The access point AP is also arranged on the train, and generally arranged inside the train. Specifically, the FSO transceiver may be arranged outside the train or inside the train.

In one specific embodiment, in selecting the second target FSO transceiver from the FSO transceivers that are currently located within the signal coverage of the target FSO base station, the specific steps performed by the central controller 11 may include followings steps. A traffic load is acquired for each FSO transceiver that is currently located within the signal coverage of the target FSO base station, and the FSO transceiver with the minimum traffic load is determined as the second target FSO transceiver.

In another specific embodiment, in selecting the second target FSO transceiver from the FSO transceivers that are currently located within the signal coverage of the target FSO base station, the specific steps performed by the central controller 11 may include followings steps. A communication distance between the target user terminal and each FSO transceiver that is currently located within the signal coverage of the target FSO base station is acquired, and the FSO transceiver with the minimum communication distance is determined as the second target FSO transceiver.

In yet another specific embodiment, in selecting the second target FSO transceiver from the FSO transceivers that are currently located within the signal coverage of the target FSO base station, the specific steps performed by the central controller 11 may include followings steps. A traffic load is acquired for each FSO transceiver that is currently located within the signal coverage of the target FSO base station, and a first weight coefficient is determined for each FSO transceiver that is currently located within the signal coverage of the target FSO base station based on magnitude of the traffic load. A communication distance between the target user terminal and each FSO transceiver that is currently located within the signal coverage of the target FSO base station is acquired, and a second weight coefficient is determined for each FSO transceiver that is currently located within the signal coverage of the target FSO base station based on magnitude of the communication distance. A priority index is calculated for each FSO transceiver based on the first weight coefficient and the second weight coefficient, and the FSO transceiver with the maximum priority index is determined as the second target FSO transceiver.

Further, the system for rail transit communication in this embodiment of the present disclosure may further include a rotator arranged on each FSO transceiver. The rotator arranged on each FSO transceiver is configured to adjust an azimuth of the FSO transceiver based on an actual communication state of the FSO transceiver in communication between the FSO transceiver and outside, to optimize communication quality of a corresponding communication network.

Further, the system for rail transit communication in this embodiment of the present disclosure may further include a rotator arranged on each FSO base station. The rotator arranged on each FSO base station is configured to adjust an azimuth of the FSO base station based on an actual communication state of the FSO base station in communication between the FSO base station and outside, to optimize communication quality of a corresponding communication network.

According to this embodiment of the present disclosure, in a case that the first target FSO transceiver moves out of the signal coverage of the target FSO base station during the data communication between the target FSO base station and the target user terminal via the first target FSO transceiver, it means that the target user terminal is unable to communicate with the target FSO base station via the first target FSO transceiver at such time. According to this embodiment of the present disclosure, one FSO transceiver is selected from all the FSO transceivers that are currently located within the signal coverage of the target FSO base station, and the selected FSO transceiver is used to replace the previous first target FSO transceiver, so that the target user terminal can continue using the broadband internet services. Namely, the selected FSO transceiver described above is used to maintain the data communication between the target FSO base station and the target user terminal. Thereby, in a case that the first target FSO transceiver has moved out of the signal coverage of the target FSO base station, the target user terminal can continue using the broadband internet services without being handed over among the FSO base stations with which it communicates. Hence, frequency of handover among the base stations is reduced for the user terminal. Additionally, the rail transit communication is implemented based on FSO communication technology according to this embodiment of the present disclosure. Compared with other communication technologies, the FSO communication technology has a higher data communication rate, and can better improve the communication experience of passengers.

It should be further noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The method and the system for rail transit communication according to the present disclosure are described above in detail. The principles and implementations of the present disclosure are described herein by using specific embodiments, and the description of the aforementioned embodiments is merely intended to help appreciate the method of the present invention and the key concept thereof. Further, for those skilled in the art, specific embodiments and application scopes may be changed based on concepts of the present disclosure. In summary, the content of the specification should not be construed as a limitation to the present disclosure.

The invention claimed is:

1. A method for rail transit communication, applied to a system for rail transit communication,
wherein the system comprises free-space optical communication (FSO) transceivers and a central controller that are located on a train, and FSO base stations located on a rail transit path, and
wherein the method comprises:
detecting that a first target FSO transceiver moves out of a signal coverage of a target FSO base station when data communication between target FSO base station and a target user terminal is performed via the first target FSO transceiver, wherein the target FSO base station is one of the FSO base stations located on the rail transit path;
selecting a second target FSO transceiver from the FSO transceivers that are currently located within the signal coverage of the target FSO base station; and
maintaining the data communication between the target FSO base station and the target user terminal, by using the second target FSO transceiver;
wherein selecting the second target FSO transceiver from the FSO transceivers that are currently located within the signal coverage of the target FSO base station comprises:
acquiring a traffic load of each of the FSO transceivers that are currently located within the signal coverage of the target FSO base station;
determining a first weight coefficient for each of the FSO transceivers that are currently located within the signal coverage of the target FSO base station, based on magnitude of the traffic load;
acquiring a communication distance between the target user terminal and each of the FSO transceivers that are currently located within the signal coverage of the target FSO base station;
determining a second weight coefficient for each of the FSO transceivers that are currently located within the signal coverage of the target FSO base station, based on magnitude of the communication distance;

calculating a priority index, for each of the FSO transceivers that are currently located within the signal coverage of the target FSO base station, based on the first weight coefficient and the second weight coefficient; and determining one FSO transceiver with a maximum of the priority index, among the FSO transceivers that are currently located within the signal coverage of the target FSO base station, as the second target FSO transceiver.

2. The method for rail transit communication according to claim 1, further comprising:

adjusting an azimuth of each of the FSO transceivers based on an actual communication state of said FSO transceiver, to keep said FSO transceiver being aligned with one of the FSO base stations with which said FSO transceiver communicates.

3. The method for rail transit communication according to claim 1, further comprising:

adjusting an azimuth of each of the FSO base stations based on an actual communication state of said FSO base station, to keep said FSO base station being aligned with one of the FSO transceivers with which said FSO base station communicates.

4. A system for rail transit communication, comprising free-space optical communication (FSO) transceivers and a central controller that are located on a train, and FSO base stations located on a rail transit path, wherein:

the central controller calls instructions in a memory to perform:

detecting that a first target FSO transceiver moves out of a signal coverage of a target FSO base station when data communication between the target FSO base station and a target user terminal is performed via the first target FSO transceiver;

selecting a second target FSO transceiver from the FSO transceivers that are currently located within the signal coverage of the target FSO base station; and maintaining the data communication between the target FSO base station and the target user terminal, by using the second target FSO transceiver;

wherein the target FSO base station is one of the FSO base stations located on the rail transit path; and wherein the central controller in selecting the second target FSO transceiver from the FSO transceivers that are currently located within the signal coverage of the target FSO base station performs:

acquiring a traffic load of each of the FSO transceivers that are currently located within the signal coverage of the target FSO base station;

determining a first weight coefficient for each of the FSO transceivers that are currently located within the signal coverage of the target FSO base station, based on magnitude of the traffic load;

acquiring a communication distance between the target user terminal and each of the FSO transceivers that are currently located within the signal coverage of the target FSO base station;

determining a second weight coefficient for each of the FSO transceivers that are currently located within the signal coverage of the target FSO base station, based on magnitude of the communication distance;

calculating a priority index, for each of the FSO transceivers that are currently located within the signal coverage of the target FSO base station, based on the first weight coefficient and the second weight coefficient; and determining one FSO transceiver with a maximum of the priority index, among the FSO transceivers that are currently located within the signal coverage of the target FSO base station, as the second target FSO transceiver.

5. The system for rail transit communication according to claim 4, wherein the system further comprises a rotator arranged on each of the FSO transceivers, and the rotator is configured to adjust an azimuth of said FSO transceiver based on an actual communication state of said FSO transceiver, to keep said FSO transceiver being aligned with one of the FSO base stations with which said FSO transceiver communicates.

6. The system for rail transit communication according to claim 4, wherein the system further comprises a rotator arranged on each of the FSO transceivers, and the rotator is configured to adjust an azimuth of said FSO base station based on an actual communication state of said FSO base station, to keep said FSO base station being aligned with one of the FSO transceivers with which said FSO base station communicates.

* * * * *